M. A. PEARSON.
ADJUSTING MEANS FOR PRESSURE ROLLS.
APPLICATION FILED MAY 1, 1912.
1,079,876.
Patented Nov. 25, 1913.
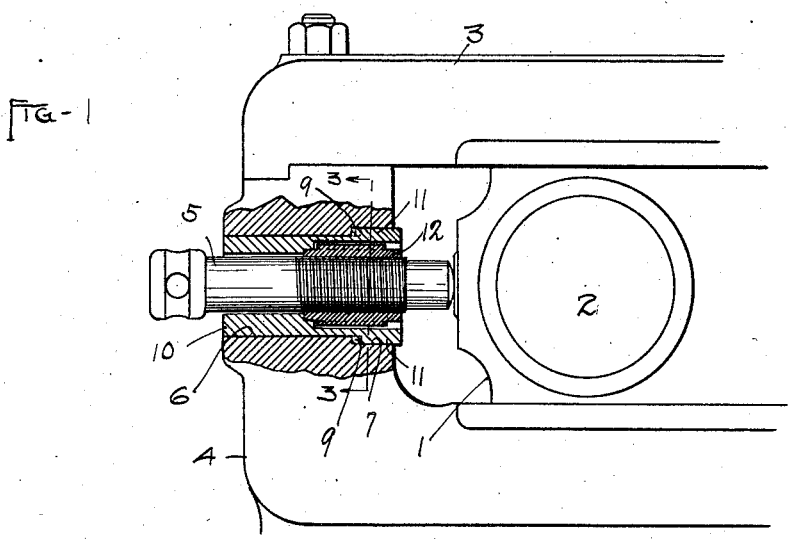
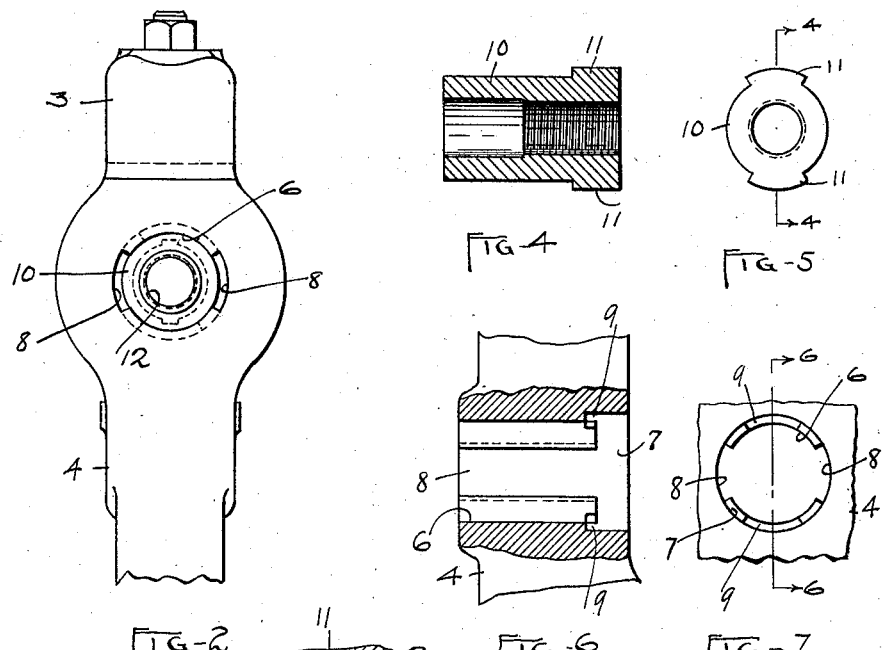
WITNESSES=
Oliver M. Kappler
Robert M. See
INVENTOR
Morris A. Pearson
BY J. B. Fay
ATTORNEY
COLUMBIA PLANOGRAPH CO., WASHINGTON, D. C.

UNITED STATES PATENT OFFICE.

MORRIS A. PEARSON, OF CUYAHOGA FALLS, OHIO, ASSIGNOR TO THE TURNER, VAUGHN & TAYLOR COMPANY, OF CUYAHOGA FALLS, OHIO, A CORPORATION OF OHIO.

ADJUSTING MEANS FOR PRESSURE-ROLLS.

1,079,876.

Specification of Letters Patent. Patented Nov. 25, 1913.

Application filed May 1, 1912. Serial No. 694,508.

*To all whom it may concern:*

Be it known that I, MORRIS A. PEARSON, a citizen of the United States, and a resident of Cuyahoga Falls, county of Summit, and State of Ohio, have invented a new and useful Improvement in Adjusting Means for Pressure-Rolls, of which the following is a specification, the principle of the invention being herein explained and the best mode in which I have contemplated applying that principle, so as to distinguish it from other inventions.

In a mounting for pressure rolls, such, for example, as are employed in various calendering and like processes, it is desirable and necessary that provision be made for adjusting the rolls relatively to each other. This is generally accomplished in the case of rolls of a diameter up to 12 inches by means of an adjusting screw threaded directly into the frame wherein the roll to be adjusted is supported, which screw contacts at its inner end with a slidable bearing block that receives the end of the roll; while in the case of larger rolls, a nut fitted into the frame from the inner, or roll, side receives said screw. In the first construction, when the threads either of the screw, or more particularly of the opening in the frame in which such screw is threaded, become worn, it is a matter of some difficulty to make an effective repair without replacing the entire frame member; while in the second construction the roll and its supports require to be disturbed in order to get at the nut to repair or replace the same. Furthermore, in either construction, if any undue pressure be encountered as by passing some unexpectedly hard substance through between the rolls, either the threads just referred to must be stripped, or else the frame be broken.

The object of the present invention is to provide for the more ready replacement of an adjusting screw in a mounting such as the one just described, while at the same time providing a safety mounting which will break without serious damage upon undue pressure being encountered. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing:—Figure 1 is an end elevational view of a roll and a mounting therefor embodying my present improvement, such mounting being partly shown in section; Fig. 2 is an elevation of such mounting as viewed from the left in Fig. 1; Fig. 3 is a sectional view thereof taken on the line 3—3, Fig. 1; Fig. 4 is a sectional view and Fig. 5 an end elevation of a removable bushing that forms a feature of such mounting, such bushing being slightly modified in form from that in Fig. 1; Fig. 6 is a section and Fig. 7 an end elevation of the opening in the frame which receives such bushing, whether of the form illustrated in Fig. 1, or Fig. 4.

A slidable block 1, Fig. 1, provides the bearing for the end of the roller 2, such block being held between the two frame members 3 and 4 in familiar fashion. The adjusting screw 5 for variously positioning such bearing block requires, of course, to be in line with the direction of movement of the latter. In the adjacent portion of frame member 4 I accordingly provide a correspondingly alined opening 6 which, however, is of a larger diameter than said adjusting screw. The forward end 7 of this opening is enlarged, as clearly shown in Fig. 6, and a plurality of recesses 8, (two diametrically opposed ones being shown in the construction illustrated), are formed in the opening proper, such recesses extending from the outer face of the frame through into the enlargement 7 of the opening at the inner end of the same. In the rear wall of such enlargement are provided other shallow recesses 9 that are located intermediate between the recesses 8, and are of corresponding form and disposition. The adjusting screw 5 is then carried in an interiorly threaded bushing or nut 10, the outer diameter of which is such as to snugly fit the opening 6 in the frame. This bushing, however, is provided at its inner end with radial lugs or ears 11 formed and disposed to fit both the recesses 8 which extend longitudinally of the opening 6 and the shallow recesses 9 in the rear wall of the enlargement 7 of such opening. Accordingly, such bushing may be inserted or removed from the opening by bringing the lugs therein into register with such first-named recesses 8; while, by giving said bushing a fractional turn when inserted, said lugs are brought into register with the other recesses 9 and the bushing thereby securely locked in place in the frame. With the bushing thus locked, adjustment of the screw may be had by turning the same in said bushing in the usual way.

In the form of bushing illustrated in Figs. 1, 2 and 3, an inner bushing 12, preferably of brass, is provided to carry the threads. This is, however, a matter of indifference, and the threads may be formed directly in the winged bushing, as shown in Figs. 4 and 5. The manner of securing the bushing 10 in the opening in the frame is obviously the same in either form of construction.

By means of the foregoing construction, it will be seen that should the thread in the bushing become worn, by simply replacing the bushing in the one case, or an inner bushing in the other, and if necessary replacing the screw, the mechanism is made as good as new. To remove the bushing, of course, it is first necessary to partially unthread the adjusting screw; thereupon the bushing may be pushed forward a sufficient amount to disengage the lugs from the shallow recesses so that by turning it the proper fractional amount, it can be directly withdrawn. By making the strength of the lugs less than the strength of the frame, moreover, the bushing will act as a breaking piece, thus saving the frame and the rest of the mechanism in case of accident.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the class described, the combination of a frame; an adjustable roll-support; a screw for adjusting said support; and an interiorly threaded bushing forming a nut for said screw, said bushing being formed with radial lugs at its inner end and said frame having a longitudinally recessed opening adapted to receive and removably hold said bushing in one axial position of the latter, other shallow recesses being formed at the inner end of said opening adapted to receive the lugs on said bushing upon the latter being given a fractional turn from such first position.

2. In mechanism of the class described, the combination of a frame; an adjustable roll-support; a screw for adjusting said support; and an interiorly threaded bushing forming a nut for said screw, said bushing being formed with radial lugs at its inner end and said frame having a longitudinally recessed opening adapted to receive and removably hold said bushing in one axial position of the latter, the inner portion of such opening being enlarged to the depth of said recesses and other shallow recesses being formed in said enlarged portion to receive the lugs on said bushing upon the latter being given a fractional turn from such first position.

Signed by me this 24th day of April, 1912.

MORRIS A. PEARSON.

Attested by—
S. A. VAUGHN,
JNO. B. FREER.

---

Copies of this patent may be obtained for five cents each, by addressing the "Commissioner of Patents, Washington, D. C."